United States Patent
Mani et al.

(10) Patent No.: US 9,361,874 B2
(45) Date of Patent: Jun. 7, 2016

(54) VARYING ADAPTIVE FILTER STEP SIZE IN ACOUSTIC ECHO CANCELLATION

(71) Applicant: Imagination Technologies Limited, Kings Langley (GB)

(72) Inventors: Senthil Kumar Mani, Hyderabad (IN); Srinivas Akella, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 177 days.

(21) Appl. No.: 14/483,807

(22) Filed: Sep. 11, 2014

(65) Prior Publication Data

US 2015/0078567 A1 Mar. 19, 2015

(30) Foreign Application Priority Data

Sep. 18, 2013 (GB) .................................. 1316598.0

(51) Int. Cl.
*H04B 3/20* (2006.01)
*G10K 11/175* (2006.01)
*H04B 3/23* (2006.01)
*H04M 9/08* (2006.01)
*H04R 27/00* (2006.01)

(52) U.S. Cl.
CPC ................ *G10K 11/175* (2013.01); *H04B 3/23* (2013.01); *H04M 9/082* (2013.01)

(58) Field of Classification Search
CPC ....... G10K 11/175; H04B 3/23; H04M 9/082; G10L 2021/02082; G10L 21/0208
USPC .................. 381/66, 83, 93, 96, 58, 94.1–94.3, 381/71.11; 379/406.01; 704/E21.004, 226, 704/233; 700/94
See application file for complete search history.

(56) References Cited

U.S. PATENT DOCUMENTS

2009/0123002 A1* 5/2009 Karthik ................. H04M 9/082
381/66

FOREIGN PATENT DOCUMENTS

| EP | 0721274 B1 | 11/2005 |
| EP | 2444967 A1 | 4/2012 |
| WO | WO 93/17510 A1 | 9/1993 |
| WO | WO 99/67940 A1 | 12/1999 |
| WO | WO 9967940 A1 * | 12/1999 ............ H04M 9/082 |

OTHER PUBLICATIONS

Haykin, Adaptive Filter Theory, Third Edition, Chap. 10.
Benesty et al., Advances in Network and Acoustic Echo Cancellation, Springer, 2001.

(Continued)

*Primary Examiner* — Vivian Chin
*Assistant Examiner* — Ammar Hamid
(74) *Attorney, Agent, or Firm* — Vorys, Sater, Seymour and Pease LLP; Vincent M DeLuca (57) ABSTRACT

A method and system for acoustic echo cancellation varies a step size of an adaptive filter in an acoustic echo canceller. Far-end data is received and echo estimate data is calculated using the received far-end data. Microphone data is received and error data is calculated using the received microphone data and the echo estimate data. A first average of the microphone data and a second average of the error data are computed over a predefined number of samples. An echo leakage is estimated using the first average and the second average wherein the echo leakage indicates an extent to which the far-end data is present in the error data, and the step size of the adaptive filter is varied based on the echo leakage and a maximum allowed step size.

14 Claims, 6 Drawing Sheets

(56) References Cited

OTHER PUBLICATIONS

Shynk, Frequency-Domain and Multirate Adaptive Filtering, IEEE SP Magazine, Jan. 1992.

Buchner et al., Generalized multichannel frequency-domain adaptive filtering: efficient realization and application to hands-free speech communication, Elsevier, Sep. 2003.

Soo et al., Multidelay Block Frequency Domain Adaptive Filter, IEEE Transactions on Acoustics, Speech and Signal Processing, vol. 38, No. 2, Feb. 1990.

Borrallo et al., On the implementation of a partitioned block frequency domain adaptive filter (PBFDAF) for long acoustic echo cancellation, Signal Processing 27, pp. 301-315.

Mansour et al., Unconstrained Frequency Domain Adaptive Filter, IEEE Transactions on Acoustics, Speech and Signal Processing, vol. ASSP-30, No. 5, Oct. 1982.

Kumar, Variable Step Size (VSS) control for Circular Leaky Normalized Least Mean Square(CLNLMS) algorithm used in AEC, HelloSoft.

\* cited by examiner

VARYING ADAPTIVE FILTER STEP SIZE IN ACOUSTIC ECHO CANCELLATION

BACKGROUND

Acoustic Echo Cancellation (AEC) is a technique used for speech enhancement in various communication systems such as IP-Phone, dual mode cellular phones, voice over WLAN etc. In a communication system, acoustic echo arises when sound from the speaker of a telephone handset is picked up by the microphone of the handset. Due to the acoustic echo, speech data (or other audio data) received from a remote party, when outputted by the speaker, creates an echo of the speech (or other audio data) of the remote party in the microphone output. The role of the AEC is to identify the acoustic echo path between the speaker and the microphone and, based on the acoustic echo path and the audio data outputted from the speaker, generate an estimate of the echo received by the microphone. The estimated echo is then subtracted from the microphone output resulting in a filtered microphone output in which the acoustic echo has been at least partially suppressed.

In AEC, adaptive filtering algorithms are used to estimate echo in the microphone output. In adaptive filtering algorithms, an adaptive filter self-adjusts its coefficients by using a feedback signal in the form of error signal in order to match the changing parameters. Multi Delay Block Frequency Domain Acoustic Echo Cancellation (MDF) is an adaptive filtering algorithm which may be used for echo estimation. MDF provides low algorithmic complexity, low delay and fast convergence.

In the MDF algorithm, an adaptive filter of size L taps is split into K adaptive sub-filters, each of length L/K. The step-size for adapting the adaptive sub-filters is fixed. Delay in the MDF algorithm is mainly due to block processing delay and algorithmic delay. The block processing delay can be reduced by decreasing the size of the adaptive sub-filters. Reducing the size of the adaptive sub-filters results in processing of smaller blocks of data due to which frequency domain conversion of the data blocks results in spectral leakage, which in-turn results in lowering the convergence speed of the adaptive sub-filters. The convergence speed can be increased by increasing the size of adaptive sub-filters L/K (i.e. reducing the number of adaptive sub-filters K) but increasing the size of the adaptive sub-filters tends to increase the delay.

When the microphone data occurs, the corresponding echo estimate data may be subtracted from the microphone data to calculate error data. When the microphone data occurs, the corresponding echo estimate data may not be present yet. In such a case, the microphone data is delayed so that the far-end data can occur and the echo estimate data can be calculated from the far-end data. Thus, the microphone data may be delayed in order to calculate the error data. This delay in calculating the error data is an algorithmic delay. In addition to the delay introduced in the communication system, uneven occurrence of the far-end data and the microphone data affects the system's load handling capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided herein a method of varying a step size of an adaptive filter in an acoustic echo canceller that comprises receiving far-end data and calculating echo estimate data using the received far-end data. The method further comprises receiving microphone data and calculating error data using the received microphone data and the echo estimate data. Further, a first average of the microphone data and a second average of the error data are computed over a predefined number of samples. An echo leakage is estimated using the first average and the second average wherein the echo leakage indicates an extent to which the far-end data is present in the error data, and the step size of the adaptive filter is varied based on the echo leakage and a maximum allowed step size.

There is further provided herein a processing block configured to vary a step size of an adaptive filter in an acoustic echo canceller that comprises a receiver module, an adaptive filtering module, a subtraction module, and a variable step size module. The receiver module is configured to receive far-end data and microphone data. The adaptive filtering module is configured to calculate echo estimate data based on the received far-end data. The subtraction module is configured to calculate error data from the received microphone data and the echo estimate data. Further, the variable step size module is configured to compute a first average of the received microphone data and a second average of the error data over a predefined number of samples. The variable step size module is further configured to estimate an echo leakage using the first average and the second average, wherein the echo leakage indicates an extent to which the far-end data is present in the error data, and vary the step size of the adaptive filter based on the echo leakage and a maximum allowed step size.

There is still further provided herein a computer program product configured to vary a step size of an adaptive filter in acoustic echo canceller, embodied on a computer-readable storage medium and configured so as when executed on a processor to perform the method of receiving far-end data and calculating echo estimate data from the received far-end data; receiving microphone data and calculating error data using the received microphone data and the echo estimate data; computing a first average of the microphone data and a second average of the error data over a predefined number of samples; estimating an echo leakage using the first average and the second average wherein the echo leakage indicates an extent to which the far-end data is present in the error data, and varying the step size of the adaptive filter based on the echo leakage and a maximum allowed step size.

BRIEF DESCRIPTION OF DRAWINGS

The accompanying drawings illustrate various examples. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various examples will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
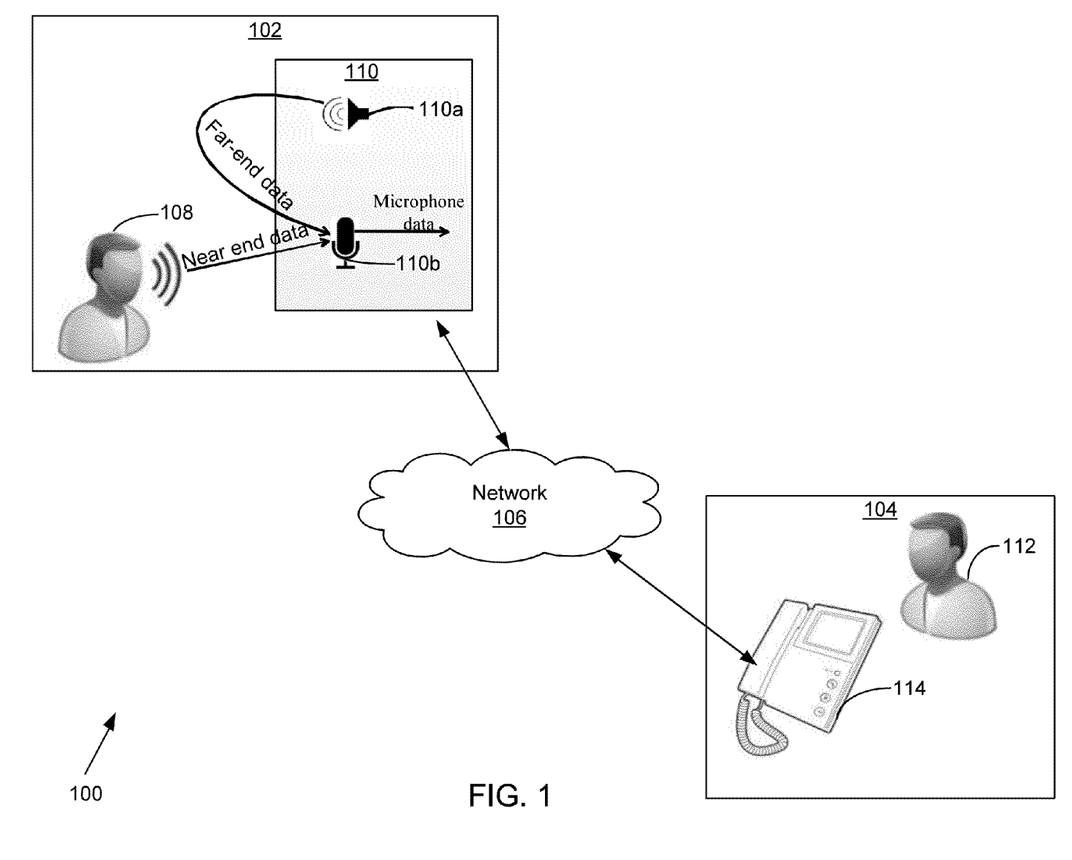
FIG. 1 is a block diagram illustrating a system environment.

FIG. 1 is a block diagram illustrating a system environment 100. The system environment 100 includes a local party 102, a remote party 104 and a network 106. The local party 102 includes a local user 108 and a local communication device 110. The local communication device 110 comprises a loudspeaker 110a and a microphone 110b. The remote party 104 includes a remote user 112 and a remote communication device 114. Examples of the local communication device 110 and the remote communication device 114 may include, but are not limited to, IP-Phone, dual mode cellular phones, voice over WLAN etc.

The network 106 corresponds to a medium through which the local communication device 110 is communicably connected to the remote communication device 114 of the system environment 100. Examples of the network 106 may include, but are not limited to, one or more of: a Wireless Fidelity (Wi-Fi) network, a Wireless Area Network (WAN), a Local Area Network (LAN), and a Metropolitan Area Network (MAN). Various devices in the system environment 100 can connect to the network 106 in accordance with various wired and wireless communication protocols, such as Transmission Control Protocol and Internet Protocol (TCP/IP), User Datagram Protocol (UDP), 2G, 3G or 4G communication protocols.

The remote communication device 114 transmits audio data generated at the remote party 104 via network 106 to the local communication device 110 at the local party 102. The audio data generated at the remote party 104 is played as the far-end data through the loudspeaker 110a of the local communication device 110. The microphone 110b of the local communication device 110 receives audio data generated by the local user 108 i.e. near end data and the far-end data outputted by the loudspeaker 110a. The data received by the microphone 110b of the local communication device 110 is microphone data and is transmitted to the remote communication device 114 via the network 106.

Figure 2:
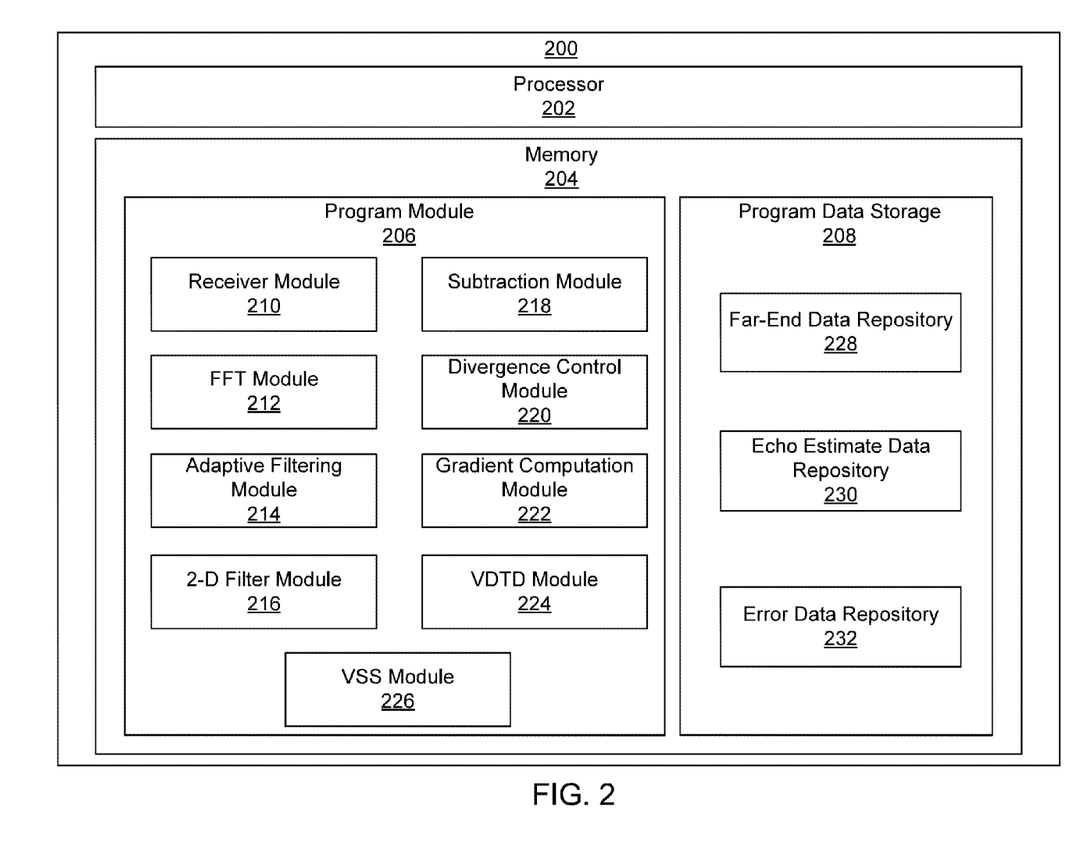
FIG. 2 is a block diagram illustrating a Frequency Domain AEC system.

FIG. 2 is a block diagram illustrating a Frequency Domain AEC system 200 which is implemented at the local communication device 110.

The Frequency Domain AEC system 200 includes a processor 202, and a memory 204. The memory 204 includes a program module 206 and a program data storage module 208. The program module 206 includes a receiver module 210, a Fast Fourier Transformation (FFT) module 212, an adaptive filtering module 214, a 2-D filter module 216, a subtraction module 218, a divergence control module 220, a gradient computation module 222, a virtual double talk detector (VDTD) module 224 and a variable step size (VSS) module 226. The program data storage module 208 includes a far-end data repository 228, an echo estimate data repository 230 and an error data repository 232. In addition to the memory 204, the processor 202 may also be coupled to one or more input/output mediums (not shown).

The processor 202 executes a set of instructions stored in the memory 204 to perform one or more operations. The processor 202 can be realized through a number of processor technologies known in the art. Examples of the processor 202 include, but are not limited to, an X86 processor, a reduced instruction set computing (RISC) processor, an application-specific integrated circuit (ASIC) processor, a complex instruction set computing (CISC) processor, or any other processor.

The memory 204 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 206 includes a set of instructions that are executable by the processor 202 to perform specific actions for the Frequency Domain AEC. It is understood by a person having ordinary skills in the art that the set of instructions in conjunction with various hardware of the Frequency Domain AEC system 200 enable the Frequency Domain AEC system 200 to perform various operations. During the execution of instructions, the far-end data repository 228, the echo estimate data repository 230 and the error data repository 232 may be accessed by the processor 202.

The receiver module 210 receives frames of the far-end data which have been sent from the remote communication device 114 and which are to be outputted from the loudspeaker 110a or an earpiece of the local communication device 110. The receiver module 210 divides the frames of the far-end data into sub-frames of length $N_S$. For example, the frames of the far-end data may be divided into sub-frames of size $N_S$=2 ms.

The receiver module 210 also receives frames of the microphone data from the microphone 110b and divides them into sub-frames of length $N_S$. However, it will be appreciated by a person having ordinary skill in the art that dividing the microphone data into sub-frames is not essential to the implementation of examples described herein and the microphone data can be directly used as-is, without dividing it into sub-frames.

The FFT module 212 is configured to convert time domain data into frequency domain data using Fast Fourier Transformation of the time domain data. The FFT module 212 also converts the frequency domain data to the time domain using Inverse Fast Fourier Transformation (FFT) of the frequency domain data, when required.

The Adaptive Filtering Module 214 calculates the echo estimate data using the far-end data. The adaptive filtering module 214 is realized using a Multi Delay Block Frequency Domain Acoustic Echo Cancellation (MDF) algorithm. In an MDF adaptive filtering algorithm, the adaptive filter of length L is split into K equal adaptive sub-filters of length L/K. The adaptive filtering module 214 filters frequency domain far-end data to compute the echo estimate data.

For example, the adaptive filter may be of length L=512, and may be split into K=16 equal sub-filters of length N=32.

The 2-D Filter module 216 reduces or removes spectral leakage, which occurs in the Frequency Domain AEC system 200 due to a small size of the adaptive-sub filters. The spectral leakage arises in the MDF adaptive filtering algorithm due to a small size (N=L/K) of the adaptive sub-filters. The length (N) of the adaptive sub-filters for the MDF adaptive filtering algorithm is smaller than the length (L) of the adaptive filter. Frequency domain conversion of sub-frames of the far-end data for adaptive sub-filters of length N requires N-point Fast Fourier Transformation computation of the far-end data by the FFT module 212. A smaller value of N for the N-point Fast Fourier Transformation computation results in more spectral leakage, which in turn results in a slower rate of convergence. Spectral leakage increases as the value of N decreases. Furthermore, the N-point Fast Fourier Transformation of the time domain far-end data considers the far-end data in a plurality of frequency bins. Due to spectral leakage, some amount of data from each of the plurality of frequency bins leaks into the neighboring frequency bins.

The 2-D filter module 216 outputs a modified power spectrum of the frequency domain far-end data. The 2-D filter module 216 approximates the power level of each of the plurality of frequency bins (except for the first and the last frequency bin) by estimating the power leakage across one or more frequency bins on either side of each of the plurality of frequency bins. For the first frequency bin, the 2-D filter module 216 will estimate leakage across the one or more subsequent frequency bins and for the last frequency bin, the 2-D filter module 216 will estimate leakage across the one or more previous frequency bins. Based on the leakage estimation from the neighboring frequency bin(s), a power level of an intermediate frequency bin is approximated. For example, for each of the frequency bins except for the first and last frequency bin, the 2-D filter module 216 may estimate the power leakage across two frequency bins i.e. one frequency bin on either side of each of the plurality of frequency bins. For the first and last frequency bins, the power leakage is estimated across one frequency bin i.e. one subsequent frequency bin for the first frequency bin and one previous frequency bin for the last frequency bin is estimated. For each of the plurality of frequency bins, the number of frequency bins across which the power leakage is estimated may be further increased, thereby further reducing the spectral leakage.

The 2-D filter module 216 may be used to reduce or remove the spectral leakage, whenever time domain data is converted into frequency domain data.

In accordance with the description given above, the 2-D filter module 216 may be realized according to the following equations:

$$P(j,i) = \begin{cases} 0.75*Z(j,i) + 0.25*Z(j,i+1); \{i=1\} \\ \left[\sum_{p=-1}^{p=1} 0.25*Z(j,i-p) + 0.5*Z(j,i)\right]; \\ \{2 \le i \le segLen-1\} \\ 0.25*Z(j,i-1) + 0.75*Z(j,i); \{i=segLen\} \end{cases}$$

Equation-1

Where,

P(j,i) is the approximated power level of $i^{th}$ frequency bin for the $j^{th}$ block, Z(j,i) is the initial power level of the $i^{th}$ frequency bin, i is the frequency bin index for the power level being approximated, segLen is the total number of frequency bins, and p corresponds to the number of neighboring frequency bins considered for approximating the power level of the $i^{th}$ frequency bin.

The equation provided to realize the 2-D filter module 216 (equation 1) is for illustration/exemplary purposes only and should not be considered limiting in any manner.

The subtraction module 218 calculates error data. Whenever microphone data is received and echo data has been estimated, the subtraction module 218 computes the error data by subtracting the received microphone data with the echo estimate data.

The divergence control module 220 limits the rate of rise of error data. It clips the error, whenever the error data rises suddenly due to false detection of near-end data e.g. due to detection of unwanted audio data (such as noise) as near-end data. When the error data, calculated by the subtraction module 218 diverges beyond a predefined threshold value, it signifies either the presence of near-end data or a change in the echo path. Also, due to false detection of near-end data, the error data shows divergence. The divergence control module 220 monitors the divergence in the error data. When a sample of the error data shows divergence with respect to a previous sample, the divergence control module 220 monitors the divergence of one or more samples of the error data following the sample of the error data. If one or more samples are also diverged, it indicates that near-end data is present. If one or more samples are not diverged, then the divergence in the error data is due to false detection of the near-end data. The divergence control module 220 clips the sample of error data when the divergence is due to false detection of the near-end data. When the near-end data is present, the divergence control module 220 reduces the step size to zero to prevent the adaptation of the adaptive sub-filters.

The gradient computation module 222 estimates a gradient from the divergence controlled error data and the far-end data. The gradient computation module 222 multiplies the conjugate of the frequency domain far-end data with frequency domain divergence controlled error data to compute the gradient. Gradient estimation is explained below in conjunction with step 506 of FIG. 5.

The virtual double talk detector (VDTD) module 224 computes a step size estimate $\mu_{vdtd}(j,i)$ used for estimating a maximum allowed step size for adapting the adaptive sub-filters of the adaptive filtering module 214. The VDTD module 224 uses correlations between the power spectral densities (PSDs) of the far-end data, echo estimate data, microphone data and the error data for computing the step size estimate $\mu_{vdtd}(j,i)$. The VDTD module 224 updates the step size estimate $\mu_{vdtd}(j,i)$ on the basis of real-time change in parameters such as echo path change or when operating in a "near-end alone region", i.e. when operating in an instance where no far-end data (e.g. only near-end data) is present in the microphone data. Updating the step size estimate $\mu_{vdtd}(j,i)$ on the basis of changing parameters allows the maximum allowed step size to be updated to match the real-time change in parameters. This in turn allows the adaptive sub-filters to be adapted to the changing parameters.

The variable step size (VSS) module 226 computes a variable step size $\mu_{opt}(j,i)$ for adapting the adaptive sub-filters on the basis of echo leakage and the maximum allowed step size. When the error data is high (indicating a large error), the VSS module 226 increases the variable step size $\mu_{opt}(j,i)$ in order to quickly converge the adaptive sub-filters. When the adaptive sub-filters are converged i.e. error data is reduced, the VSS module 226 decreases the variable step size $\mu_{opt}(j,i)$, resulting in good steady state error cancellation.

The far-end data repository 228 stores sub-frames of the far-end data which have been sent from the remote communication device 114 and which are to be outputted from the speaker 110a or an earpiece of the communication device 110.

The echo estimate data repository 230 stores the echo estimate data calculated by the adaptive filtering module 214.

The error data repository 232 stores the filtered microphone data e.g. the error data calculated by the subtraction module 218.

Figure 3:
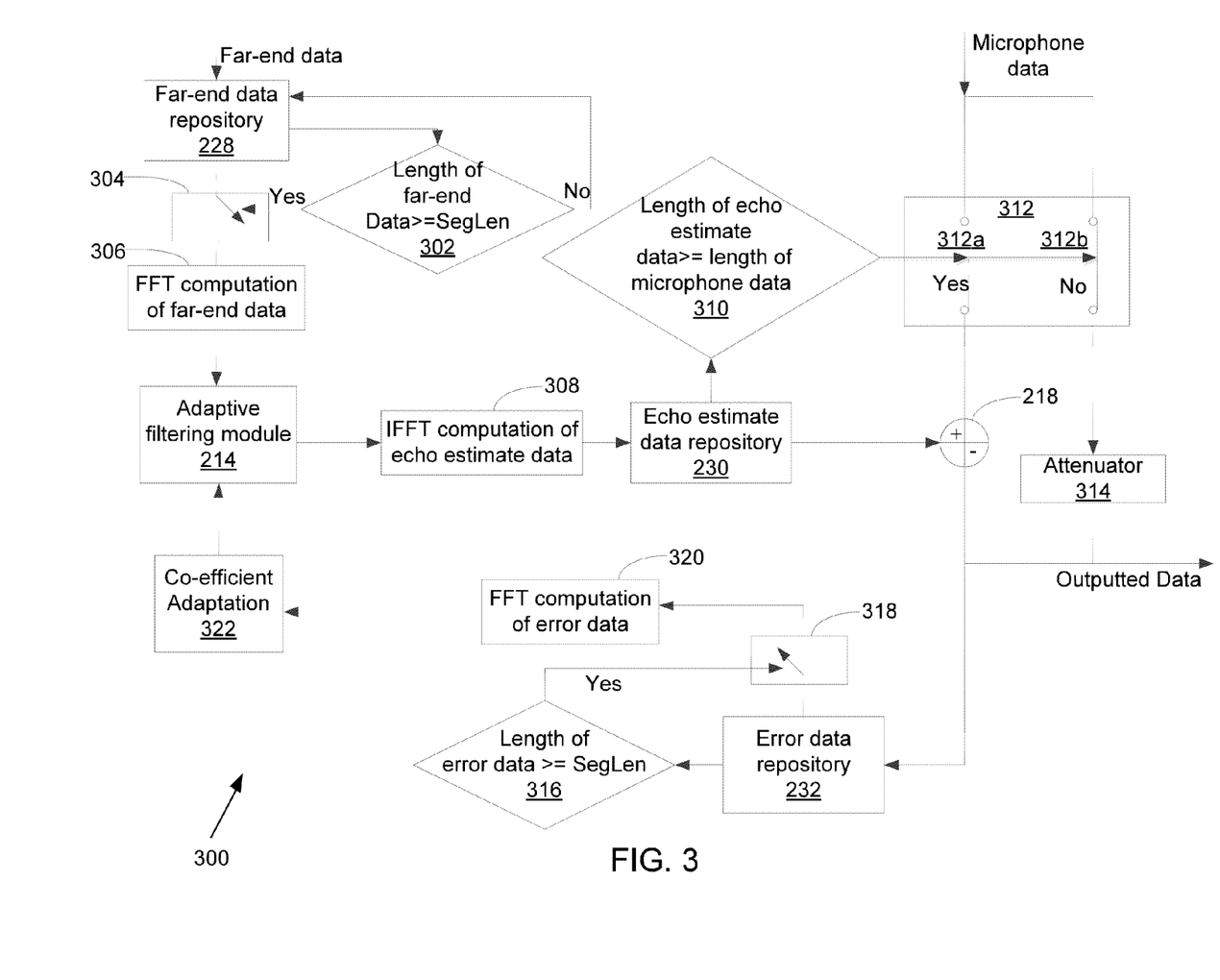
FIG. 3 is a schematic block diagram representing an example architecture of an AEC system.

FIG. 3 shows an exemplary architecture of an AEC system. Sub-frames of far-end data are stored in the far-end data repository 228. At block 302, total length of the sub-frames of the far-end data in the far-end data repository 228 is compared with the predefined length (SegLen). In an instance where the total length of the sub-frames is less than the predefined length (SegLen), the sub-frames of the far-end data continue to be stored in the far-end data repository 228.

In an instance where the total length of the sub-frames is greater than or equal to the predefined length (SegLen), a first toggle switch 304 is switched such that at block 306, the stored far-end data is converted to frequency domain far-end data. The frequency domain far-end data is used to compute echo estimate data by the adaptive sub-filters of the adaptive filtering module 214. At block 308, the echo estimate data is converted to time domain echo estimate data. The time domain echo estimate data is stored in the echo estimate data repository 230. When microphone data is received, then at block 310, the length of the time domain echo estimate data stored in the echo estimate data repository 230 is compared with the length of the received microphone data in order to determine whether there is "sufficient" echo estimate data in the echo estimate data repository 230 in order to use the echo estimate data for calculating the error data, as described below. The "length of the received microphone data" in this instance is the length of microphone data which is to be used to determine a corresponding length of error data at a particular point in time. Therefore, the "length of the received microphone data" is not necessarily all of the microphone data that has been stored since the system began receiving microphone data.

In an example, the length of microphone data and the length of echo estimate data which are used to determine the error data are the same. If the length of the echo estimate data stored in the second buffer is greater than or equal to the length of the received microphone data (that is to be used to calculate the error data at a particular point in time) then "sufficient" echo estimate data is stored in the echo estimate data repository 230. In an example, for the echo estimate data stored in the echo estimate data repository 230 to be considered "sufficient", the length of the echo estimate data stored in the echo estimate data repository 230 is greater than or equal to the length of the received microphone data. If there is enough echo estimate data in the echo estimate data repository 230 in order to calculate the error data by subtracting echo estimate data from microphone data, then this is how the error data is calculated. The echo estimate data repository 230 is also referred to herein as the "second buffer". In an instance where the length of the stored time domain echo estimate data is greater than or equal to the length of the received microphone data (i.e. there is sufficient echo estimate data in the second buffer), a second toggle switch 312a is switched such that the subtraction module 218 calculates error data by subtracting, from the received microphone data, corresponding time domain echo estimate data from the echo estimate data repository 230.

However, in an instance, where the length of the stored time domain echo estimate data is less than the length of the received microphone data (i.e. there is not sufficient echo estimate data stored in the second buffer, e.g. when the system is initiated and before enough echo estimate data has been calculated and stored in the second buffer for use in calculating the error data), a third toggle switch 312b is switched such that the subtraction module 218 is bypassed. The received microphone data may be attenuated at block 314. The attenuated microphone data is sent for further processing in the local communication device 110. Furthermore, in this case (i.e. the "insufficient" case), echo estimate data that is present in the echo estimate data repository 230, which corresponds to the microphone data that is used to calculate the error data, is removed from the echo estimate data repository 230. This echo estimate data can be removed from the echo estimate data repository 230 because it is not going to be used to calculate error data. In the example shown in FIG. 3, only one of the toggle switches 312a and 312b (not both) is switched on at any given time. The error data outputted from either the subtractor 218 or the attenuator 314 (in accordance with the result of the decision in step 310 is used as the error data and outputted for further processing in the local communication device 110.

The error data calculated by the subtraction module 218 is stored in the error data repository 232. However, if the error data has been calculated by bypassing the subtractor 218 (i.e. when the length of the stored time domain echo estimate data is less than the length of the received microphone data) then the error data is not stored in the error data repository 232. At block 316, the length of the stored error data is compared with the predefined length (SegLen). In an instance where the length of stored error data is less than the predefined length (SegLen), the error data is further stored in the error data repository 232.

In an instance where the length of stored error data is greater than or equal to the predefined length (SegLen), a fourth toggle switch 318 is switched such that at block 320, the stored error data is converted to frequency domain error data. At block 322, the frequency domain error data is used to update the coefficients of the adaptive sub-filters in the adaptive filtering module 214.

Figure 4A:
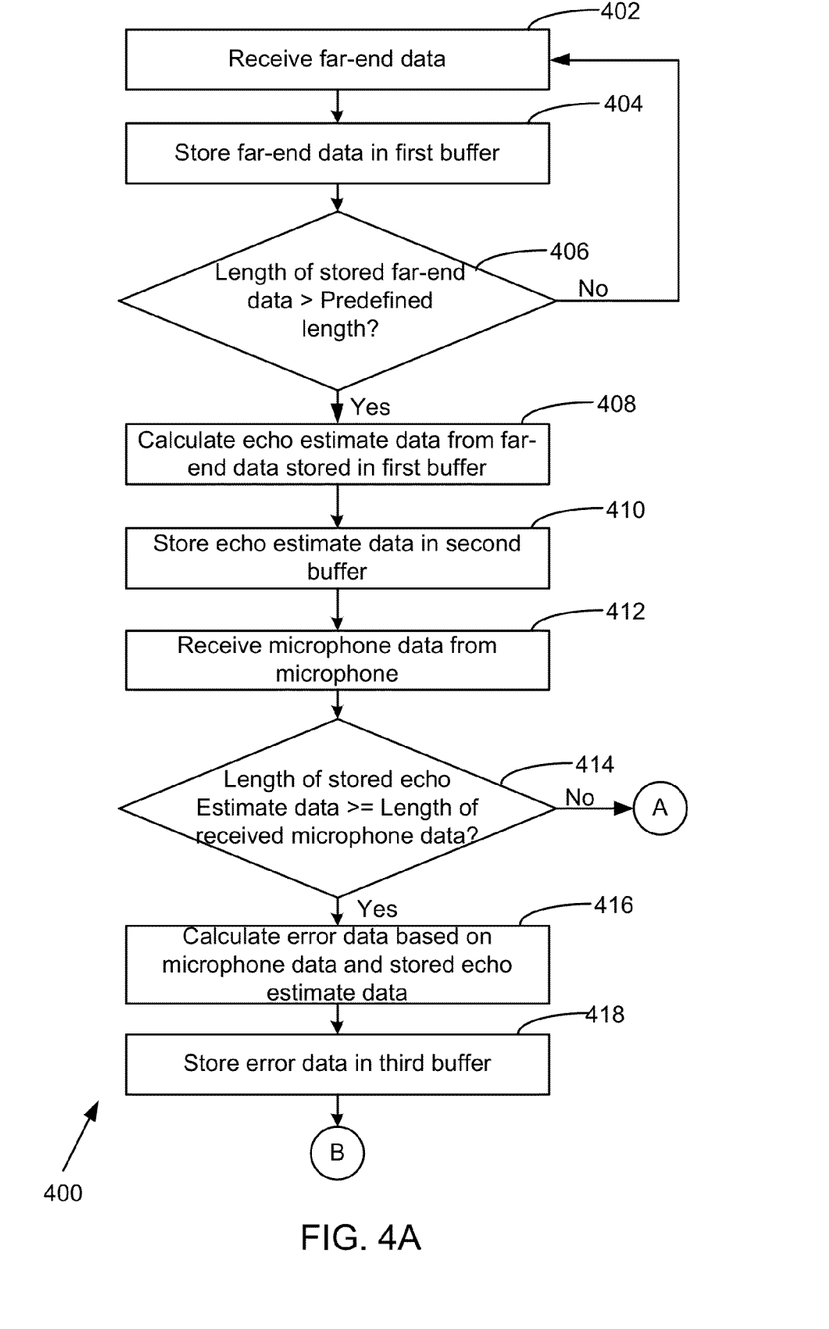
FIGS. 4A and 4B show a flow diagram illustrating a method for error data calculation.
Figure 4B:
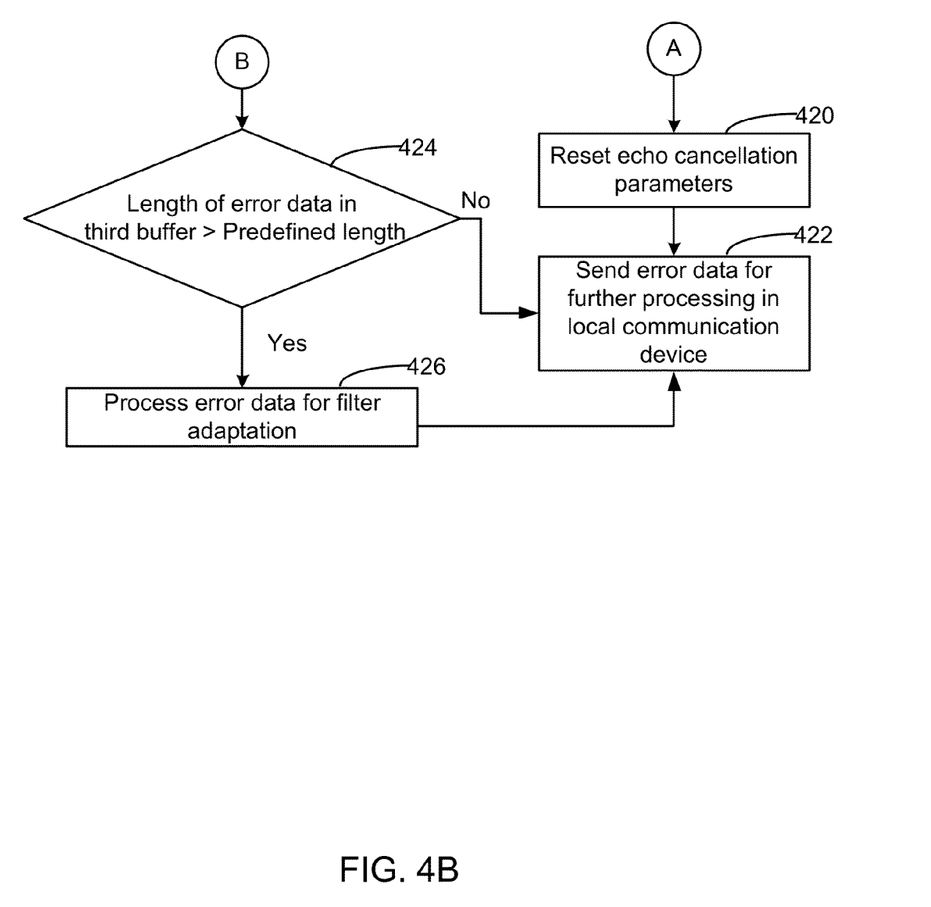

FIGS. 4A-4B are a flow diagram illustrating a method for error data calculation. At step 402, one or more frames of the far-end data are received by the receiver module 210 from the remote communication device 114 e.g. over the network 106. The receiver module 210 divides the frames of the far-end data into sub-frames of size $N_S$. For example, the size $N_S$ of the sub-frames of the far-end data may be 2 ms.

At step 404, the sub-frames of the far-end data are stored in a first buffer (shown as the "far-end data repository 228" in FIG. 3). The sub-frames of the far-end data are stored until the total length of the sub-frames of the far-end data exceeds a predefined length (indicated as "SegLen" in FIG. 3). For example, the predefined length may be 4 ms. The predefined length may be equal to the adaptive sub-filter length. It will be appreciated by a person having ordinary skill in the art that the predefined length may be set to any suitable length without departing from the scope of the examples described herein.

At step 406, the total length of the sub-frames in the far-end data repository 228 is compared with the predefined length (SegLen). In an instance where the total length of the sub-frames of the far-end data does not exceed the predefined length (SegLen), the method proceeds from step 406 to step

402. In an instance where the total length of the sub-frames of the far-end data exceeds the predefined length (SegLen), the method proceeds to step 408. At step 408, the adaptive filtering module 214 computes the echo estimate data from the far-end data stored in the far-end data repository 228. The FFT module 212 converts the sub-frames of the far-end data stored in the far-end data repository 228 into frequency domain far-end data. The frequency domain far-end data is then filtered using the adaptive sub-filters (indicated as "adaptive filtering module 214" in FIG. 3) in the adaptive filtering module 214. The output of the adaptive filtering module 214 is a frequency domain echo estimate data. The FFT module 212 then applies Inverse Fast Fourier Transformation to convert the frequency domain echo estimate data to time domain echo estimate data.

Power spectrum of the frequency domain far-end data may be fed to the 2-D filter module 216 to compensate for spectral leakage before adaptation of the adaptive filtering module 214.

At step 410, the time domain echo estimate data is stored in the second buffer (indicated as "Echo estimate data repository 230" in FIG. 3).

Thus, depending upon the availability of the far-end data, the far-end data is processed for calculating the echo estimate data and the time domain echo estimate data is stored in the echo estimate data repository 230. The far-end data may occur as a continuous stream of data. Alternatively, the far-end data may occur in bursts at uneven time intervals.

At step 412, the microphone data from the microphone 110b of the local communication device 110 is received by the receiver module 210. In an embodiment, whenever frames of the microphone data are present, the receiver module 210 divides the frames of the microphone data into sub-frames of size $N_S$. For example, the size $N_S$ of the sub-frames of the microphone data may be 2 ms. However, it will be appreciated by a person having ordinary skill in the art that dividing the microphone data in to sub-frames is not essential to the implementation of the examples described herein and the microphone data can be directly used as-is, without dividing it into sub-frames.

At step 414, the length of the echo estimate data stored in the echo estimate data repository 230 is compared with the length of the received microphone data. In an instance where the length of the echo estimate data stored in the echo estimate data repository 230 is greater than or equal to the length of the received microphone data, the method proceeds to step 416. At step 416, the second toggle switch 312a shown in FIG. 3 is switched such that error data is calculated on the basis of the received microphone data and the echo estimate data stored in the echo estimate data repository 230. The subtraction module 218 calculates the error data by subtracting, from the received microphone data, corresponding echo estimate data from the echo estimate data repository 230.

At step 418, the error data calculated by the subtraction module 218 is stored in the error data repository 232 (indicated as error data repository 232 in FIG. 3). The method passes from step 418 to step 424 which is described below.

In an instance where the length of the echo estimate data stored in the echo estimate data repository 230 is not greater than or equal to the length of the received microphone data, the method proceeds from step 414 to step 420. At step 420, the echo cancellation parameters including, but not limited to, variable step size or maximum allowed step size are reset for re-convergence of the adaptive sub-filters. In this case, the third toggle switch 312b shown in FIG. 3 is switched such that the echo estimate data stored in the echo estimate data repository 230 is not subtracted from the received microphone data to calculate the error data. Instead, the microphone data is used as the error data. Some attenuation may be applied to the microphone data before it is used as the error data, but the subtraction module 218 is bypassed by setting the third toggle switch 312b shown in FIG. 3 accordingly. In this way, when there is not enough echo estimate data to perform the subtraction, the microphone data is used as the error data, thereby avoiding a delay caused by waiting for the far-end data in the far-end buffer to reach the predefined length (SegLen). Furthermore, as described above, in this case the echo estimate data that corresponds to the microphone data used to calculate the error data is removed from the echo estimate data repository 230. In step 422 the error data is sent for further processing in the local communication device 110.

At step 424, the length of the error data stored in the error data repository 232 at step 418 is compared with the predefined length (SegLen). The predefined length is same as the length of each of the adaptive sub-filters i.e. N=L/K. In an instance where the length of the error data in the error data repository 232 is greater than or equal to the predefined length, the method proceeds to step 426, and the fourth toggle 318 shown in FIG. 3 is switched on. At step 426, the stored error data is processed further for adapting the adaptive sub-filters (in the co-efficient adaptation processing block 322 shown in FIG. 3).

The method proceeds from step 426 to step 422. As described above, in step 422 the error data (which in this case has been calculated in step 416 by subtracting the echo estimate data from the microphone data) is sent for further processing in the local communication device 110.

In an instance where the length of the error data in the error data repository 232 is not greater than or equal to the predefined length the method proceeds to from step 424 straight to step 422, and step 426 is not performed, i.e. the error data is not processed to adapt the adaptive sub-filters.

Thus, when the microphone data is present, the error data is calculated. It may be considered that the error data is calculated immediately. This is achieved by calculating the error data responsive to the reception of the microphone data. Subsequent to the far-end data in the far-end data repository 228 exceeding the predefined length (SegLen), the echo estimate data is calculated by the adaptive filtering module 214. The error data can be calculated responsive to receiving the microphone data by subtracting, from the microphone data, corresponding echo estimate data stored in the echo estimate data repository 230. The calculation of the error data does not have to wait for the computation of a length (equal to the length of the microphone data) of the corresponding echo estimate data from the far-end data due to independent processing of the far-end data and the microphone data. Therefore, the delay in calculating the error data (i.e. the algorithmic delay) is significantly reduced due to the independent processing of the far-end data and the microphone data. Furthermore, in some examples, when sufficient length of the echo estimate data is not yet present in the echo estimate data repository 230, the error data is calculated based on the microphone data (e.g. as attenuated by block 314) and not based on the echo estimate data. In that case, echo cancellation parameters may be reset and the received microphone data may be sent for further processing in the local communication device, thereby avoiding a delay caused by waiting for the occurrence of far-end data to calculate the sufficient echo estimate data for calculating the error data. For example, the delay in calculating the error data may be reduced to zero or substantially to zero (e.g. to a non-zero value, such as a few nano seconds, which may be treated by the AEC as being equivalent to zero).

Figure 5:
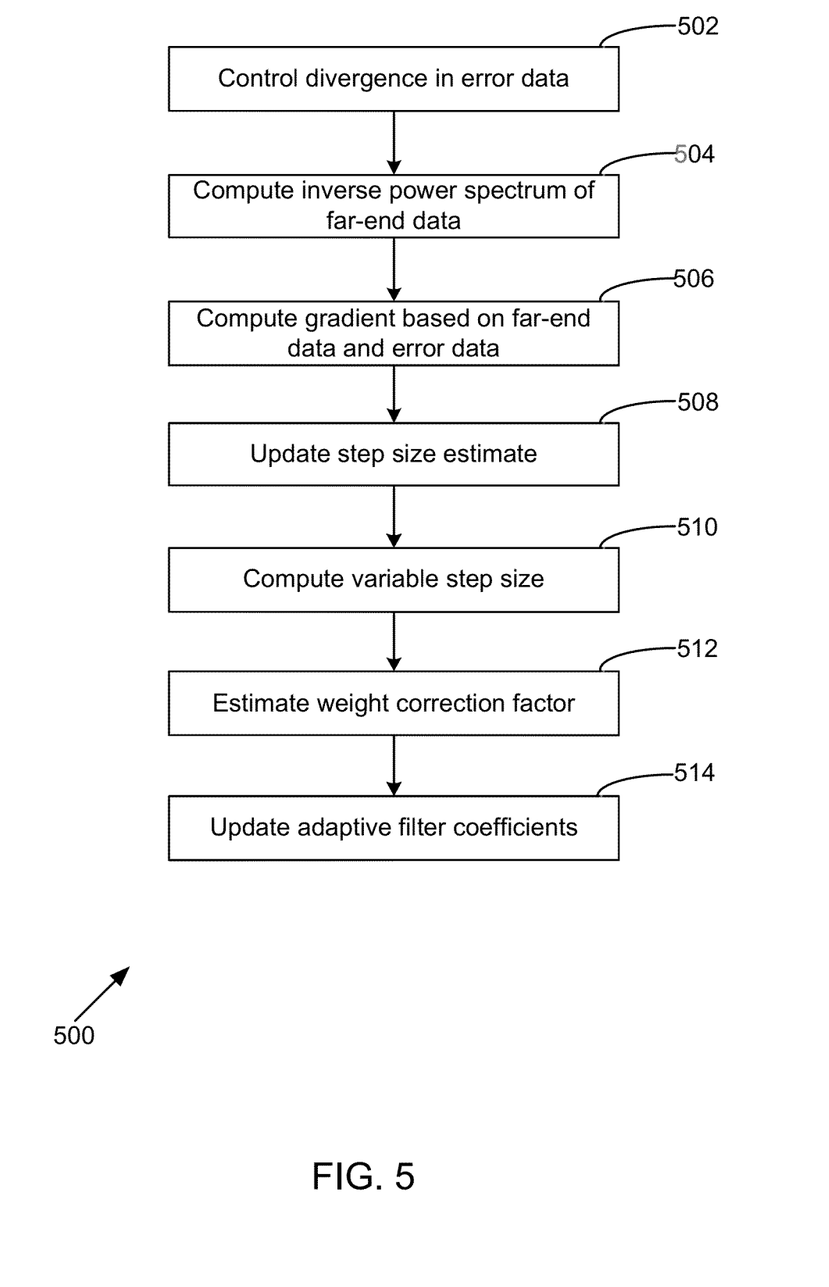
FIG. 5 is a flow diagram illustrating a method for updating coefficients of adaptive sub-filters.

FIG. 5 is a flow diagram 500 illustrating a method for updating adaptive sub-filter coefficients, used by the adaptive filtering module 214.

At step 502, divergence of the error data is controlled by the divergence control module 220. Whenever the error data exceeds a predefined threshold value due to false detection of the near-end data, the divergence control module 220 clips the error data. In an embodiment, the divergence control module 220 is realized through the following equations for controlling the divergence of the error data.

$$|l(n)| = \text{sign}(e(n))\min(\gamma_0 l_p(n), |l(n)|) \qquad \text{Equation-2}$$

$$l_p(n+1) = \begin{cases} \gamma_2 l_p(n) + \gamma_1 |l(n)| & \text{if}(\gamma_0 l_p(n) \le |l(n)|) \\ \gamma_3 l_p(n) & \text{elsewhere} \end{cases} \qquad \text{Equation-3}$$

Where, e(n) is the time domain error signal, n is the discrete sampling index l(n) is the absolute error, $l_p(n)$ is the absolute past error and $\gamma_3$, $\gamma_2$, $\gamma_1$ and $\gamma_0$ are positive constants and in an example their values are set to 1.0003, 0.9950, 0.000732 and 0.0916 respectively.

The initial value of $l_p(0)$ is set to a large value, so that the divergence control does not clip the error during initial convergence. Equation-2 is the limiting equation and equation-3 is for updating smoothed absolute past error.

It will be appreciated by a person having ordinary skill in the art that equations 2 and 3 provided to realize the divergence control module 220 are for illustration/exemplary purposes and should not be considered limiting in any manner.

At step 504, an inverse power spectrum $P(j,i)^{-1}$ for the $i^{th}$ frequency bin and $j^{th}$ block of the far-end data is computed. The sub-frames of the far-end data are converted to the frequency domain by the FFT module 212. The frequency domain sub-frames of the far-end data are then used for generating the power spectrum $P^k(j,i)$ of the far-end data.

In an embodiment, following equation represents the power spectrum for samples of the $j^{th}$ block of far-end data for all adaptive sub-filters.

$$P^k(j,i) = \begin{cases} P^{k+1}(j-1, i); & \forall ((k, k \ne K), i) \\ [(X^K(j, i))^* * X^K(j, i)]; & k = K \end{cases} \qquad \text{Equation-4}$$

Where, $P^k(j,i)$ represents the power spectrum of the $k^{th}$ sub-filter for samples of the $j^{th}$ block of far-end data, K is the number of adaptive sub-filters, i is the frequency bin index, and $X^K(j,i)$ is the input to the $K^{th}$ sub filter for the $j^{th}$ block in frequency bin i.

It will be appreciated by a person having ordinary skill in the art that equation 4 provided to represent the power spectrum for samples of the $j^{th}$ block of far-end data for all adaptive sub-filters is for illustration/exemplary purposes and should not be considered limiting in any manner.

The power spectrum of the far-end data is then filtered by the 2-D filter module 216 to compensate for the spectral leakage which as described above is due to the computation of the N point Fast Fourier Transformation of the far-end data. The 2-D filter module 216 has already been explained in detail in conjunction with the explanation for FIG. 2. Referring again to FIG. 4, inverse power spectrum $P(j,i)^{-1}$ for the $i^{th}$ frequency bin index is then computed from the filtered power spectrum of the far-end data.

At step 506, a gradient $\Phi^k(j,i)$, for the $k^{th}$ sub filter for the $j^{th}$ block and frequency bin i, is computed from the far-end data and the error data by the gradient computation module 222. The divergence controlled error data and the sub-frames of the far-end data are converted to frequency domain by the FFT module 212. The conjugate of the frequency domain far-end data is then computed. The conjugate of the frequency domain far-end data is multiplied with the frequency domain error data to compute the gradient $\Phi^k(j,i)$.

For better convergence, the gradient is converted to time domain and the last N samples of the time domain gradient are updated with zeros. The updated time domain gradient is then converted to frequency domain gradient $\Phi^k(j,i)$.

At step 508, a step size estimate $\mu_{vdtd}(j,i)$, for each of the i frequency bins is updated by the VDTD module 224. Smoothed power spectral densities (PSDs) of the far-end data, echo estimate data, microphone data and the error data are computed from the frequency domain far-end data, frequency domain echo estimate data, frequency domain microphone data and frequency domain error data respectively. In an example, the following equation can be used for computing the smoothed PSD of the far-end data:

$$P_x(j,i) = [X^K(j,i) * X^{*K}(j,i) - P_x(j-1,i)]\lambda + P_x(j-1,i) \qquad \text{Equation-5}$$

Where, $P_x(j,i)$ is the smoothed power spectrum of the far-end data, $X^K(j,i)$ represents the $K^{th}$ sub filter's frequency domain far-end data, $X^{*K}(j,i)$ represents the conjugate of $K^{th}$ sub filter's frequency domain far-end data.

j and (j−1) refers to the $j^{th}$ and $(j-1)^{th}$ block of the far-end data, i is the frequency bin index, and λ is a smoothening parameter, which may, for example, be set to 0.125.

Corresponding equations can be used for computing the smoothed PSDs of the echo estimate data, microphone data and error data.

It will be appreciated by a person having ordinary skill in the art that equations provided to compute the smoothed PSDs of the far-end data, echo estimate data, microphone data and the error data is simply for illustration/exemplary purposes and should not be considered limiting in any manner.

A first correlation $R_{ey}$ between the PSDs of the echo estimate data and the error data, a second correlation $R_{xe}$ between the PSDs of the error data and the far-end data, a third correlation $R_{ed}$ between the PSDs of microphone data and the error data and an auto correlation $R_{yy}$ for the PSD of echo estimate data are computed. A residual echo factor $\xi(j,i)$ is estimated for the $i^{th}$ frequency bin from the power spectrum of the echo estimate data, the error data and the microphone data. In an example, the following equation can be used for estimating the residual echo factor $\xi(j,i)$.

$$\xi(j, i) = \frac{|P_d(j, i) * P_e(j, i)|}{|P_y(j, i)|^2}; \qquad \text{Equation-6}$$

Where, $P_y(j,i)$ is the smoothened power spectrum of the echo-estimate data, $P_e(j,i)$ is the smoothened power spectrum of the error data, and $P_d(j,i)$ is the smoothened power spectrum of the microphone data.

It will be appreciated by a person having ordinary skill in the art that equation 6 provided to estimate the residual echo factor $\xi(j,i)$ is for illustration/exemplary purposes and should not be considered limiting in any manner.

A leakage factor $\eta(j)$ for each of the frequency bins is computed on the basis of the first correlation, the second correlation, the third correlation and the fourth auto correlation. The leakage factor is used to determine a measure of the extent to which the far-end data is present in the error data. In an example, the following equation can be used for computing the leakage factor.

$$\eta(j) = \frac{\sum_{\forall i} R_{ey}(j, i) + \sum_{\forall i} R_{xe}(j, i)}{\sum_{\forall i} R_{ed}(j, i) + \sum_{\forall i} R_{yy}(j, i)} \quad \text{Equation-7}$$

Where, $\eta(j)$ is the leakage factor, $R_{ey}(j,i)$ is the first correlation between the error data and the echo estimate data, $R_{xe}(j,i)$ is the second correlation between the far-end data and the error data, $R_{ed}(j,i)$ is the third correlation between the error data and the microphone data, and $R_{yy}(j,i)$ is the auto correlation for the echo estimate data, and i is the frequency bin index.

It will be appreciated by a person having ordinary skill in the art that equation 7 provided to compute the leakage factor is for illustration/exemplary purposes and should not be considered limiting in any manner.

In an embodiment, the correlations $R_{ey}(j,i)$ and $R_{xe}(j,i)$ in the numerator of the above equation can be estimated using the following equations:

$$R^1_{ey}(j, i) = P_e(j, i) * P_y(j, i); \quad \text{Equation-8}$$
$$\Delta R_{ey}(j, i) = R^1_{ey}(j, i) - R_{ey}(j-1, i);$$
$$R_{ey}(j, i) = \begin{cases} R_{ey}(j-1, i) + \Delta R_{ey}(j, i) * \alpha_1; & \Delta R_{ey}(j, i) > 0 \\ R_{ey}(j-1, i) + \Delta R_{ey}(j, i) * \alpha_2; & \text{otherwise} \end{cases}$$

$$R^1_{xe}(j, i) = P_x(j, i) * P_e(j, i); \quad \text{Equation-9}$$
$$\Delta R_{xe}(j, i) = R^1_{xe}(j, i) - R_{xe}(j-1, i);$$
$$R_{xe}(j, i) = \begin{cases} R_{xe}(j-1, i) + \Delta R_{xe}(j, i) * \alpha_1; & \Delta R_{xe}(j, i) > 0 \\ R_{xe}(j-1, i) + \Delta R_{xe}(j, i) * \alpha_2; & \text{otherwise} \end{cases}$$

$\alpha_1$ and $\alpha_2$ are numbers which can be set. For example, the estimated correlations of the numerator of the leakage factor $\eta(j)$ are shaped for sharp rise and slow decay using parameters $\alpha_1=0.4$ and $\alpha_2=0.05$, to update the step size estimate $\mu_{vdtd}(j,i)$ accordingly.

It will be appreciated by a person having ordinary skill in the art that equations 8 and 9 provided to compute the correlations $R_{ey}(j,i)$ and $R_{xe}(j,i)$ are for illustration/exemplary purposes and should not be considered limiting in any manner.

In an embodiment, the correlation $R_{ed}(j,i)$ and the auto correlation $R_{yy}(j,i)$ in the denominator of the above equation can be estimated using the following equations:

$$R^1_{ed}(j, i) = P_e(j, i) * P_d(j, i); \quad \text{Equation-10}$$
$$\Delta R_{ed}(j, i) = R^1_{ed}(j, i) - R_{ed}(j-1, i);$$
$$R_{ed}(j, i) = \begin{cases} R_{ed}(j-1, i) + \Delta R_{ed}(j, i) * \beta_1; & \Delta R_{ed}(j, i) > 0 \\ R_{ed}(j-1, i) + \Delta R_{ed}(j, i) * \beta_2; & \text{otherwise} \end{cases}$$

$$R^1_{yy}(j, i) = P_y(j, i) * P_y(j, i); \quad \text{Equation-11}$$
$$\Delta R_{yy}(j, i) = R^1_{yy}(j, i) - R_{yy}(j-1, i);$$
$$R_{yy}(j, i) = \begin{cases} R_{yy}(j-1, i) + \Delta R_{yy}(j, i) * \beta_1; & \Delta R_{yy}(j, i) > 0 \\ R_{yy}(j-1, i) + \Delta R_{yy}(j, i) * \beta_2; & \text{otherwise} \end{cases}$$

$\beta_1$ and $\beta_2$ are numbers which can be set. For example, the estimated correlation and auto correlation components in the denominator of leakage factor $\eta(j)$ are shaped for slow rise and sharp decay rate using parameters $\beta_1=0.05$ and $\beta_2=0.3$ to update the step size estimate $\mu_{vdtd}(j,i)$ accordingly.

It will be appreciated by a person having ordinary skill in the art that equations 10 and 11 provided to compute the correlation $R_{ed}(j,i)$ and the auto correlation $R_{yy}(j,i)$ are for illustration/exemplary purposes and should not be considered limiting in any manner.

The product of leakage factor $\eta(j)$ and estimated residual echo parameter $\xi(j,i)$ is compared with a maximum step size, $\mu_{max}(j,i)$ for computing the maximum allowable step size, $\mu_{vdtd}(j,i)$.

$$\mu_{vdtd}(j, i) = \begin{cases} \eta(j) * \xi(j, i); & \text{if}(\eta(j) * \xi(j, i) < \mu_{max}(i)) \\ \mu_{max}(i); & \text{otherwise} \end{cases} \quad \text{Equation-12}$$

It will be appreciated by a person having ordinary skill in the art that equation 12 provided to update the step size estimate $\mu_{vdtd}(j,i)$ is for illustration/exemplary purposes and should not be considered limiting in any manner.

The significance of the above equations (6, 7 and 12) for step size estimation $\mu_{vdtd}(j,i)$ can be understood by considering the following echo cancellation scenarios:

1. Startup Phase of Echo Cancellation:
   a) Single Talk: In this case, the far-end data and the error data are highly correlated i.e. $R_{xe}$ is high showing large echo leakage and, $R_{ey}$ and $R_{yy}$ are very small as the echo estimate data is zero. Also $\xi(j,i)$ is large as the echo estimate data is low, resulting in high step size estimate $\mu_{vdtd}(j,i)$.
   b) Near End Alone: In this case, $R_{xe}$ and $R_{ey}$ are zero as there will be no correlation in the near end alone region. The leakage factor $\eta(j)$ is zero, resulting in no adaptation of the adaptive sub-filters.
   c) Double Talk: Since the echo estimate data is very low, $R_{ey}$ and $R_{yy}$ are very low. The leakage factor $\eta(j)$ is a function of $R_{xe}$ in the numerator and $R_{ed}$ in the denominator.

2. Convergence Phase of Echo Cancellation:
   a. Single Talk: In this phase, the far-end data, the near end data, the echo estimate data and the error data are correlated with each other. Auto correlation $R_{yy}$ of the echo estimate data, in the denominator is the weighting factor to the leakage factor $\eta(j)$.
   b. Near End Alone: In this case, the numerator terms $R_{xe}$ and $R_{ey}$ are zero as there will be no correlation of the far-end data, the echo estimate data with the error data in near end alone region. The leakage factor $\eta(j)$ is zero, resulting in no adaptation of the adaptive sub-filters.

c. Double Talk: In this scenario, the leakage factor η(j) depends on the near end to echo ratio and is low.

3. Steady State Phase of Echo Cancellation:

a) Single Talk: In this case the far-end data and the echo estimate data are uncorrelated with the error data as the error data is very small, thereby reducing the numerator of the leakage factor η(j) to a very small value, resulting in a very small step size estimate $\mu_{vdtd}(j,i)$.

b) Near end Alone: In this case, numerator terms $R_{xe}$ and $R_{ey}$ are zero as there will be no correlation of the far-end data and the echo estimate data with the error data. The leakage factor η(j) is zero, resulting in no adaptation of the adaptive sub-filters.

c) Double Talk: In this scenario, correlation of the error data, the echo estimate data and the far-end data is low. In the denominator of the leakage factor η(j), $R_{yy}$ is small and correlation of the near end data and the error data, $R_{ed}$ is high, depending on near end to echo ratio.

The step size estimate $\mu_{vdtd}(j,i)$ is used to update the maximum allowed step size for adapting the adaptive sub-filters. In echo regions, value of $\mu_{vdtd}(j,i)$ varies with respect to the above equation. When only the near-end data is present $\mu_{vdtd}(j,i)$ will be zero as filter adaptation is not required.

At step 510, the variable step size $\mu_{opt}(j)$ for adapting the adaptive sub-filters is computed by the VSS module 226. The step size for adapting the adaptive sub-filters is varied: on the basis of a long-term average of the power spectrum of microphone data, which is denoted $P_{ld}(j,i)$, and a long term average of the power spectrum of error data, which is denoted $P_{le}(j,i)$. For example, the following equations may be used to compute long-term averages of the power spectrum of error data and the microphone data:

$$P_{le}(j,i) = P_{le}(j,i-1) + \gamma_4(|E(j,i)| - P_{le}(j,i-1))$$

$$P_{ld}(j,i) = P_{ld}(j,i-1) + \gamma_4(|D(j,i)| - P_{ld}(j,i-1)) \quad \text{Equation-13}$$

where, E(j,i) is frequency domain representation of error data for $j^{th}$ frame and $i^{th}$ frequency bin index, D(j,i) is frequency domain representation of microphone data for $j^{th}$ frame and $i^{th}$ frequency bin index, and $\gamma_4$ is a constant equal to $(N+1)^{-1}$, where N is the number of samples that are considered in the long term averages.

It will be appreciated by a person having ordinary skill in the art that equation 13 provided to compute the long-term averages of the error data and the microphone data is for illustration/exemplary purposes and should not be considered limiting in any manner.

An echo leakage parameter Δ(j,i) for the $i^{th}$ frequency bin is computed on the basis of long term averages of the microphone data and the error data. In an example, the following equation is used to compute the echo leakage parameter Δ(j,i):

$$\mu(j,i) = (P_{ld}(j,i)/P_{ld}(j,i)) \quad \text{Equation-14}$$

It will be appreciated by a person having ordinary skill in the art that equation 14 provided to compute the echo leakage parameter Δ(j,i) is for illustration/exemplary purposes and should not be considered limiting in any manner. The echo leakage parameter Δ(j,i) corresponds to a measure of the extent to which the far-end data is present in the error data.

The variable step size $\mu_{opt}(j)$ for the $k^{th}$ adaptive sub-filter is estimated on the basis of the maximum allowed step size $\mu_{max}(i)$ allowed for the current sample of echo data, and the echo leakage parameter Δ(j,i). The maximum allowed step size $\mu_{max}(i)$ depends on a learning speedup counter cntr(i). The learning speed up counter cntr(i) is used to avoid high step size applied due to high value of leakage parameter Δ(j,i).

In an embodiment, the learning speedup counter is incremented by the following equation.

$$cntr(i+1) = \begin{cases} 0; & \text{if}(\eta(j) < \eta_{min}) \\ [cntr(i) + 1]; & \text{otherwise} \end{cases} \quad \text{Equation-15}$$

Where $\eta_{min}$ is a minimum leakage factor, may be set, for example, to be 0.0002.

It will be appreciated by a person having ordinary skill in the art that equation 15 provided to increment the learning speedup counter is for illustration/exemplary purposes and should not be considered limiting in any manner.

In the above disclosed embodiment, the variable step size $\mu_{opt}(j)$ is estimated for the $i^{th}$ frequency bin index of the $k^{th}$ adaptive sub-filter. In similar ways, the variable step size is estimated for the frequency bin indices of all the adaptive sub-filters.

In an embodiment, the following equation is used to compute the maximum allowed step size $\mu_{max}(i)$ allowed for the current sample of echo data and echo leakage parameter Δ(j,i):

$$\mu_{max}(i) = \begin{cases} \dfrac{\mu_{vdtd}(j,i)}{4}; & \text{if}(cntr(i) < 5) \\ \mu_{vdtd}(j,i); & \text{otherwise} \end{cases} \quad \text{Equation-16}$$

The maximum allowed step size $\mu_{max}(i)$ corresponds to a maximum value beyond which the step size cannot be varied. It will be appreciated by a person having ordinary skill in the art that equation 16 provided to compute the maximum allowed step size $\mu_{max}(i)$ allowed for the current frequency bin of echo data and echo leakage parameter Δ(j,i) is for illustration/exemplary purposes and should not be considered limiting in any manner.

To reduce the mis-adjustment or to increase the steady state echo cancellation, the step size is limited by the echo leakage parameter Δ(j,i). Therefore, a very small step size is applied when the adaptive filter has converged. In an example, the following equation is used to compute the variable step size $\mu_{opt}(j)$.

$$\mu_{opt}(j,i) = \min\left(\mu_{max}(i), \dfrac{\Delta(j,i)}{1.25N}\right) \quad \text{Equation-17}$$

It will be appreciated by a person having ordinary skill in the art that equation 17 provided to compute the variable step size $\mu_{opt}(j)$ is for illustration/exemplary purposes and should not be considered limiting in any manner.

At step 512, a weight correction factor $\Delta^k(j,i)$ is estimated on the basis of the inverse power spectrum $P(j,i)^{-1}$, the gradient $\Phi^k(j,i)$ and the variable step size $\mu_{opt}(j)$. In an embodiment, the following equation is used to estimate the weight correction factor $$\Delta^k(j,i): \Delta^k(j,i) = \left(\left(\dfrac{2K\mu}{Z(j,i)}\right)\Phi^k(j,i)\right), \forall (k,i) \quad \text{Equation-18}$$

It will be appreciated by a person having ordinary skill in the art that equation 18 provided to estimate the weight correction factor $\Delta^k(j,i)$ is for illustration/exemplary purposes and should not be considered limiting in any manner.

At step 514, the coefficients of the adaptive sub-filters are updated on the basis of the weight correction factor $\Delta^k(j,i)$. In an example, the following equation represents the updating of the adaptive sub-filter coefficients:

$$W^k(j+1,i) = W^k(j,i) + \Delta^k(j,i), \forall (k,i) \quad \text{Equation-19}$$

It will be appreciated by a person having ordinary skill in the art that equation 19 provided to update the adaptive sub-filter coefficients is for illustration/exemplary purposes and should not be considered limiting in any manner.

The current coefficients of the adaptive sub-filters are replaced with the coefficients calculated at step 514. Thus, the adaptive sub-filters are adapted to match the changing parameters resulting in effective acoustic echo cancellation. When frames of the microphone data are received, the error data is calculated and, when the error data has been calculated based on the echo estimate data then the coefficients corresponding to each of the plurality of frequency bins of the error data are updated to adapt the adaptive sub-filters to match the changing parameters. Therefore, the step size estimate is varied based on the estimated echo leakage and a maximum allowed step size.

The above disclosed embodiments are described with reference to frequency domain acoustic echo cancellation. However, the disclosed methods and systems, as illustrated in the ongoing description can also be implemented in the time domain. In an example, for time domain acoustic echo cancellation, the variable step size is computed for each of the samples of the error data. Based on the variable step size, gradient and inverse power spectrum of the far-end data, the coefficients corresponding to each of the samples of the microphone data are updated.

Further, in an embodiment, the 2-D filter module 216 is not used in the time domain acoustic echo cancellation.

Further in an embodiment, for time domain acoustic echo cancellation, the 2-D filter module 216 can be used to compensate for the spectral leakage due to a small size of the adaptive sub-filters.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system may execute a set of instructions (which are e.g. programmable or computer-readable instructions) that are stored in one or more storage elements, in order to process input data. The storage elements may also hold data or other information, as desired. The storage elements may be in the form of an information source or a physical memory element present in the processing machine.

The programmable or computer-readable instructions may include various commands that instruct the processing machine to perform specific tasks such as steps that constitute the method of the disclosure. The method and systems described herein may be implemented using software modules or hardware modules or a combination thereof. The disclosure is independent of the programming language and the operating system used in a computer implementing the method. The instructions for the disclosure can be written in any suitable programming language including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine.

The programmable instructions can be stored and transmitted on a computer-readable medium. The disclosure can also be embodied in a computer program product comprising a computer-readable medium, or with any product capable of implementing the above methods and systems, or the numerous possible variations thereof. The computer readable medium may be configured as a computer readable storage medium and thus is not a signal bearing medium.

The methods and systems as described herein, allow for reducing the algorithmic delay i.e. the delay in calculating the error data. Due to independent processing of the far-end data and the microphone data, the microphone data is processed immediately without waiting for equal amount of echo estimate data.

Furthermore, the methods and systems described herein include load balancing of the processor. The far-end data and the microphone data are processed based on the data availability. Whenever the far-end data occurs, the echo estimate data is calculated and stored in the echo estimate data repository 230. Whenever a length of microphone data occurs, the processor is not required to immediately process the equal length of far-end data to calculate the error estimate data. Hence, it provides load balancing even during a bunch of multiple microphone data frames or far-end data frames.

Furthermore, the methods and systems described herein include increased convergence speed and higher steady state error cancellation. The step size for updating the coefficients is varied based on the changing parameters including, but not limited to, echo path change or false detection of near end. The variable step size is increased when the error data is high, ensuring quick convergence of the adaptive sub-filters, and the variable step size is decreased when the adaptive sub-filters are converged, ensuring increase in steady state error cancellation.

Various embodiments of the methods and systems for acoustic echo cancellation have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of varying a step size of an adaptive filter in an acoustic echo canceller, the method comprising:
   calculating echo estimate data using received far-end data;
   calculating error data using the echo estimate data and received microphone data;
   computing a first average of the microphone data over a predefined number of samples and a second average of the error data over the predefined number of samples;
   estimating an echo leakage using the first average and the second average, wherein the echo leakage indicates an extent to which the far-end data is present in the error data; and
   varying the step size of the adaptive filter based on the estimated echo leakage and a maximum allowed step size;
   wherein the adaptive filter is used in acoustic echo cancellation by said acoustic echo canceller.

2. The method of claim 1 further comprising:
   measuring a first correlation between the echo estimate data and the error data, a second correlation between the far-end data and the error data, a third correlation between the microphone data and the error data, and an auto correlation for the echo estimate data;
   calculating a leakage factor on the basis of the first correlation, the second correlation, the third correlation and the auto correlation, wherein the leakage factor is for use in determining a measure of the extent to which the far-end data is present in the error data; and
   computing a step size estimate on the basis of the leakage factor.

3. The method of claim 1, wherein the maximum allowed step size is computed on the basis of the step size estimate.

4. The method of claim 1 further comprising converting the far-end data to frequency domain far-end data using Fast Fourier Transformation, wherein the frequency domain far-end data corresponds to a plurality of frequency bins.

5. The method of claim 4 further comprising approximating a power level of each of the plurality of frequency bins on the basis of power levels of one or more frequency bins on at least one side of each of the plurality of frequency bins.

6. The method of claim 1 further comprising monitoring a divergence of one or more samples of the error data.

7. The method of claim 6 further comprising correcting the error data on the basis of the divergence and a threshold value of the error data.

8. A processing device configured to vary a step size of an adaptive filter in an acoustic echo canceller, the processing device comprising:
   a receiver module configured to receive far-end data and microphone data;
   an adaptive filtering module configured to calculate echo estimate data on the basis of the far-end data;
   a subtraction module configured to calculate error data on the basis of the echo estimate data and the microphone data; and
   a variable step size module configured to:
      compute a first average of the microphone data over a predefined number of samples and a second average of the error data over the predefined number of samples;
      estimate an echo leakage using the first average and the second average, wherein the echo leakage indicates an extent to which the far-end data is present in the error data; and
      vary the step size of the adaptive filter based on the estimated echo leakage and a maximum allowed step size;
   wherein the adaptive filter is used in acoustic echo cancellation by said acoustic echo canceller.

9. The processing device of claim 8 further comprising a virtual double talk detector module configured to:
   measure a first correlation between the echo estimate data and the error data, a second correlation between the far-end data and the error data, a third correlation between the microphone data and the error data, and an auto correlation for the echo estimate data;
   calculate a leakage factor on the basis of the first correlation, the second correlation, the third correlation and the auto correlation, wherein the leakage factor is for use in determining a measure of the extent to which the far-end data is present in the error data; and
   compute a step size estimate on the basis of the leakage factor.

10. The processing device of claim 8 further comprising a Fast Fourier Transformation module configured to convert the far-end data to frequency domain far-end data, wherein the frequency domain far-end data corresponds to a plurality of frequency bins.

11. The processing device of claim 10 further comprising a 2-D filter module configured to approximate a power level of each of the plurality of frequency bins on the basis of power levels of one or more frequency bins on at least one side of each of the plurality of frequency bins.

12. The processing device of claim 8 further comprising a divergence control module configured to monitor a divergence of one or more samples of the error data.

13. The processing device of claim 12, wherein the divergence control module is further configured to correct the error data on the basis of the divergence and a threshold value of the error data.

14. A computer program product embodied on a non-transitory computer-readable storage medium and comprising processor-executable instructions for varying a step size of an adaptive filter in an acoustic echo canceller, that when executed cause a processor to:
   calculate echo estimate data using received far-end data;
   calculate error data using the echo estimate data and received microphone data;
   compute a first average of the microphone data over a predefined number of samples and a second average of the error data over the predefined number of samples;
   estimate an echo leakage using the first average and the second average, wherein the echo leakage indicates an extent to which the far-end data is present in the error data; and
   vary the step size of the adaptive filter based on the estimated echo leakage and a maximum allowed step size;
   wherein the adaptive filter is used in acoustic echo cancellation by the acoustic echo canceller.

* * * * *